United States Patent Office 3,338,923
Patented Aug. 29, 1967

3,338,923
PROCESS OF PURIFYING PYROMELLITIC DIANHYDRIDE
Karl Peterlein, Gladbeck, Germany, assignor to Gelsenberg Benzin Aktiengesellschaft, Gelsenkirchen, Germany
No Drawing. Filed Mar. 2, 1966, Ser. No. 531,033
Claims priority, application Germany, Mar. 24, 1965, G 43,153
5 Claims. (Cl. 260—346.3)

This invention relates to a new method of purifying pyromellitic dianhydride.

Crude pyromellitic anhydride, such as is obtained by the gaseous-phase oxidation of 1,2,4,5-substituted tetraalkyl aromatics, as for example Durol, or 1,2,4-trimethyl-5-isopropyl benzene, is generally contaminated by other acids or anhydrides, as for instance with maleic anhydride, phthalic acid, trimellitic anhydride, etc., these being in part colored compounds. In the preparation of polycondensates from pyromellitic dianhydride, for example polypyromellitimides, a very pure anhydride is, however, required so that it is necessary extensively to remove any of the impurities which may act to break the chain.

The crude pyromellitic anhydride product can be purified by distillation or sublimation. The still crude anhydride product obtained following prepurification by distillation or any other measure, or crude pyromellitic anhydride not prepurified can also be purified by recrystallization. If dehydrating compounds are used for the recrystallization, as for instance acetic anhydride, then simultaneously with the purification any free pyromellitic acid which may be present is converted into the anhydride. Alternatively, instead of purifying the crude anhydride, it can first be converted by addition of water into pyromellitic acid and the latter then subjected to purification, for instance to recrystallization from water in the presence of activated carbon.

It is furthermore known that pyromellitic anhydride forms adducts with aromatic compounds, such as o-xylene or anisol, and it has already been proposed (see German patent application G 42,761) to use this adduct formation for the purification of crude pyromellitic anhydride.

In all of the known procedures, however, it is not possible, or else only possible with large losses of dianhydride product, to obtain a pyromellitic dianhydride which is both free of the presence of disturbing compounds, and which is also free of color. For example, while purification of the crude anhydride by distillation effects a substantial improvement in color, it is not possible by this method alone, to substantially remove the byproducts produced in the oxidation reaction, for instance the di- or tri-carboxylic anhydrides byproducts.

Nor is the removal of the secondary byproducts to the extent required generally possible by recrystallization. Purification via the formation of addition compounds of pyromellitic anhydride with, for instance, o-xylene, to be sure, results in a substantial removal of the disturbing side components, but the quality of the color of the resultant products is not always satisfactory, even when there is simultaneously used activated carbon.

An object of the present invention is the provision of a new method for removing substantially all of the disturbing byproducts from the crude pyromellitic dianhydride synthesis product.

A further object of the invention is the provision of a new method for purifying pyromellitic dianhydride which is simple and easy to carry out and results in the production of a substantially colorless product.

Still other objects and advantages of the invention will be apparent from the following discussion of the new method.

It has been found that pyromellitic anhydride substantially free of impurities and from color can be obtained from crude pyromellitic dianhydride, regardless of the starting materials from which, or the method by which the anhydride has been prepared by scrubbing the crude pyromellitic anhydride with a lower aliphatic or cycloaliphatic ketone.

Suitable ketones for use as scrubbing agents are, for instance, acetone, methylethylketone and cyclohexanone; acetone being particularly preferred.

The method of the invention is carried out by mixing the powdered pyromellitic dianhydride which is to be purified with such a quantity of the ketone as to obtain a slurry which can be stirred. For this purpose, there is generally sufficient about 20% by weight ketone, referred to the anhydride to be purified. After the mixture has been allowed to stand for several hours at room temperature, the anhydride is recovered by suction filtration or centrifugation. The residue from the filtration or centrifugation is preferably again washed with the same amount of ketone at room temperature. After separating off the ketone, the purified anhydride is dried in the customary manner.

The carrying out of the purification at room temperature leads to a substantial purification of the anhydride, but higher temperatures can also be employed.

The method can also be carried out in that instead of the said washing, recrystallization of the anhydride is carried out. In general, however, the method is effected, as first set out and as described in the examples, at room temperature, without recrystallization, since a substantial advantage of the ketone solvents resides precisely in the possibility of obtaining under these economical conditions a purifying action which is satisfactory for substantially all applications.

The solvents, i.e., ketones used in the purification, can be readily separated by distillation and possibly step-wise concentration from the byproducts contained in them, and recovered for further use. A large part of the pyromellitic anhydride which was present in solution together with the impurities precipitates out of such concentrated solution. This portion can be used again in the process in order to increase the yield of purified product.

The following examples further illustrate the invention and show some of the advantages which it provides. The examples, however, are not intended to limit the generally broad scope of the present invention in strict accordance therewith.

Example 1

100 parts of a crude, yellowish-brown pyromellitic dianhydride which had been obtained by gaseous-phase oxidation of 1,4-dimethyl-2,5-diisopropyl benzene with air, were stirred at room temperature with 20 parts of acetone. After standing for three hours, the acetone was removed by suction filtration and the filter residue washed with an additional 20 parts of acetone. After drying, 92 parts of a substantially colorless product were obtained.

The result of the purification treatment can be observed from a consideration of the following table.

TABLE I

| | Crude product | Purified dianhydride |
|---|---|---|
| Neutralization number (mg.KOH/gram) | 996 | 1,028 |
| Wt. percent Pyromellitic dianhydride | 93.2 | 99.1 |
| Wt. percent Pyromellitic acid | 3.0 | 0.04 |
| Color | Yellow | White |
| Viscosity of the polycondensate with ethylene glycol, cp. at 20° C | 150 | 371 |

The neutralization number was determined by titrating a sample of the anhydride dissolved in water with 1 N KOH.

The viscosity values refer to the solution of a polyester which was obtained by condensing for two hours 8.91 grams of purified anhydride and 2.54 grams of ethylene glycol at 80° C. in 25 ml. of dimethylformamide.

*Example 2*

A pyromellitic anhydride prepurified by distillation was treated with the ketones hereinafter set out by the method set forth in Example 1. By way of comparison, the values which were obtained with chloroform and ethanol as washing liquid are supplied. A partial esterification took place when ethanol was used.

TABLE II

| | Color | Neutralization number, mg. KOH/g. | Pyromellitic dianhydride, wt. percent | Pyromellitic acid, wt. percent | Viscosity of the polycondensate, cp. |
|---|---|---|---|---|---|
| Product used | Yellow | 1,018 | 95.2 | 1.0 | 262 |
| Washing agent: | | | | | |
| Acetone | White | 1,028 | 99.0 | 0.1 | 393 |
| Methylethylketone | do | 1,028 | 98.8 | 0.25 | 375 |
| Methylpropylketone | do | 1,027 | 98.7 | 0.25 | 374 |
| Cyclohexanone | do | 1,026 | 98.3 | 0.1 | 362 |
| Chloroform | do | 1,025 | 96.4 | 1.0 | 280 |
| Ethanol | do | 993 | 91.8 | 0.9 | 186 |

From the table, it can be noted that the ketones in accordance with the present invention when used for the purification of pyromellitic dianhydride result inter alia in a substantial improvement of the ability of pyromellitic dianhydride to undergo polycondensation.

What is claimed is as follows:

1. Method of purifying pyromellitic dianhydride which comprises scrubbing impure pyromellitic dianhydride with a member selected from the group consisting of acetone, methylethyl ketone, methylpropyl ketone, and cyclohexanone.

2. Method according to claim 1 wherein said group member is acetone.

3. Method according to claim 1 wherein said scrubbing takes place at room temperature.

4. Method of purifying pyromellitic dianhydride which comprises scrubbing impure pyromellitic dianhydride with a member selected from the group conssting of acetone, methylethyl ketone, methylpropyl ketone, and cyclohexanone, and separating the scrubbing agent from said mixture.

5. Method according to claim 1 wherein said group member is used in an amount of 20% by weight referred to said pyromellitic dianhydride.

References Cited

UNITED STATES PATENTS 3,239,537    3/1966    Steckler et al. _____ 260—346

NICHOLAS S. RIZZO, *Primary Examiner.*